United States Patent [19]

Yokozawa

[11] Patent Number: 4,947,272
[45] Date of Patent: Aug. 7, 1990

[54] SIGNAL REPRODUCING DEVICE WHICH OFFSETS THE TRACKING ERROR SIGNAL FOR A DIGITAL TAPE PLAYER

[75] Inventor: Seiichi Yokozawa, Saitama, Japan

[73] Assignee: Pioneer Electronic Corporation, Tokyo, Japan

[21] Appl. No.: 169,252

[22] Filed: Mar. 16, 1988

[30] Foreign Application Priority Data

Mar. 30, 1987 [JP] Japan .................................. 62-79188
Mar. 30, 1987 [JP] Japan .................................. 62-79189

[51] Int. Cl.$^5$ ...................... G11B 5/584; G11B 15/467
[52] U.S. Cl. .................................... 360/77.15; 360/32
[58] Field of Search .................. 360/13, 14.1, 18, 19.1, 360/27, 31, 32, 70, 77.01, 77.02, 77.04, 77.07, 77.08–77.15, 78.02; 364/43, 44

[56] References Cited

U.S. PATENT DOCUMENTS 4,303,953 12/1981 Sanderson ......................... 360/78.02
4,780,774 10/1988 Edakubo et al. ................... 360/77.15

FOREIGN PATENT DOCUMENTS 61-72484 4/1986 Japan .

Primary Examiner—Aristotelis M. Psitos
Assistant Examiner—Steven R. Garland
Attorney, Agent, or Firm—Sughrue, Mion, Zinn, Macpeak & Seas

[57] ABSTRACT

A signal reproducing device for an R-DAT employing offsetting of the tracking error signal in which the digital error rate is significantly reduced. A head assembly traces tracks on which predetermined digital data and tracking pilot signals have been recorded, the head assembly having a larger tracking width than the tracks. The pilot signal is detected from the reproduction output of the head assembly to form a tracking error signal. The number of digital data errors in the reproduction output from the head assembly are counted, and the counted value is compared with predetermined reference values. An offset signal is added to the tracking error signal according to the comparison result. A servo circuit controls the tracking conditions of the head assembly according to the addition result.

1 Claim, 8 Drawing Sheets

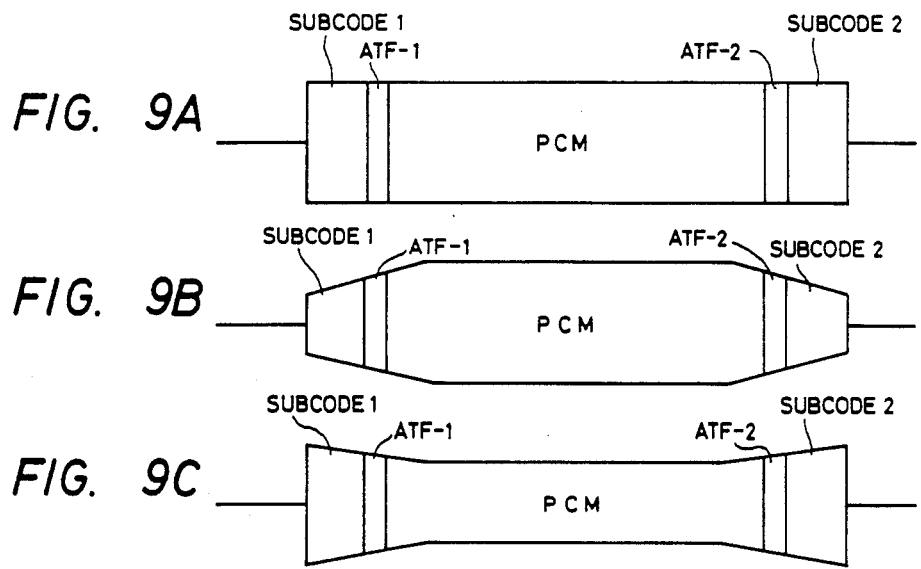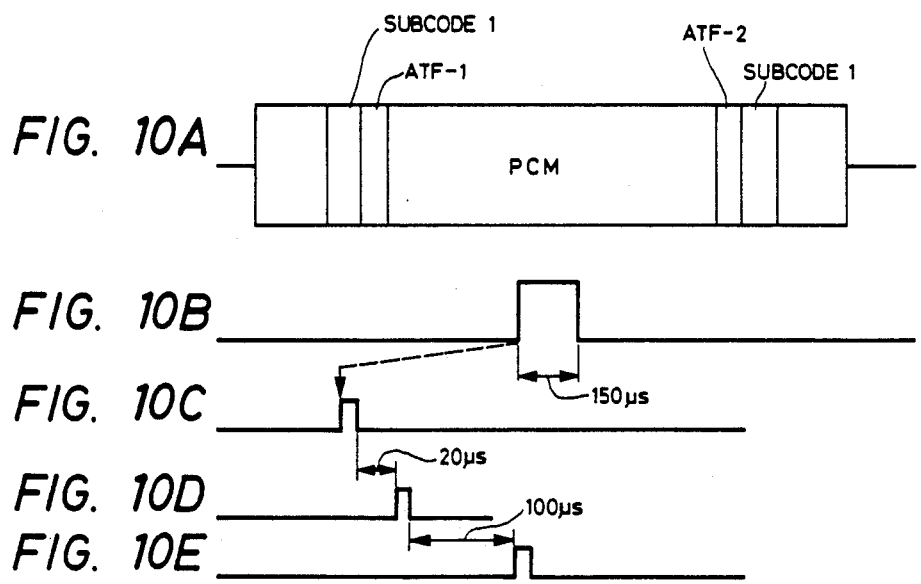

SIGNAL REPRODUCING DEVICE WHICH OFFSETS THE TRACKING ERROR SIGNAL FOR A DIGITAL TAPE PLAYER

BACKGROUND OF THE INVENTION

The present invention relates to a signal reproducing device, a typical example of which is an R-DAT.

In an R-DAT, data are recorded on or reproduced from a magnetic tape wound through an angle of about 90° on a rotary drum using a pair of rotary heads A and B spaced 180° from each other. A PCM audio signal is recorded on a track substantially at the middle of the type corresponding to an angle of 90°, and sub-code signals (SUB-1 and SUB-2) are recorded before and after the PCM audio signal. A tracking signal (ATF signal) is recorded between the sub-code signal and the PCM audio signal as shown in FIG. 1. In FIG. 1, $f_1$ designates a pilot signal; $f_2$, the synchronizing signal of the track (track A) traced by the rotary head A; $f_3$, the synchronizing signal of the track (track B) traced by the head B and which is different in azimuth from the head A; and $f_4$, an erasing signal. A tracking error signal is formed according to the level difference between the pilot signal $f_1$ reproduced from the right track when the synchronizing signal $f_2$ or $f_3$ is detected and the pilot signal $f_1$ reproduced from the left track a predetermined period of time after the detection of the synchronizing signal. In the reproduction (playback) mode, the heads A and B trace the respective tracks in such a manner that the centers of the heads coincide with those of the respective tracks.

In the case where PCM audio signals are to be recorded on the tracks on which predetermined sub-code signals together with tracking signals (ATF signals) have been recorded, for a PCM recording region, each rotary head records the PCM audio signal, and for the remaining region the mode is switched over to a reproduction (playback) mode. In this case, tracking error signals are formed in accordance with the reproduced ATF signals to control the tracking of the rotary heads A and B. As a result, the rotary heads A and B trace tracks in such a manner that the centers of the heads coincide with those of the tracks which have been previously defined. Therefore, as shown in FIG. 2, a track (PCM region) newly formed will not coincide with the track (ATF region and sub-code region) which has been formed. For instance, in the case where the width W of the rotary heads A and B is 20.4 μm and the track pitch p is 13.6 μm, the tracks are shifted 3.4 μm (=(20.4−13.6)/2), the track phase difference being 45°.

In order to overcome the above-described difficulty, a method has been proposed in Japanese Patent Application No. 72484/1986 in which, in an after-recording operation, a predetermined offset signal is added to the tracking error signal to make the tracks linear.

Even if the offset signal is added to the tracking error signal in the after-recording operation, the pilot signal reproduction level, for example, will not be equal to that which is determined theoretically. Furthermore, the same apparatus is not always used for the ordinary recording operation and the after-recording operation. Therefore, it is difficult to make the recording tracks and the reproducing tracks completely coincident with each other. Depending on the conditions of the magnetic tape, sometimes offsetting the tracking error signal increases the noncoincidence of the tracks or the frequency of digital data errors.

SUMMARY OF THE INVENTION

Accordingly, an object of the invention is to prevent the above-described difficulty and to reduce the frequency of occurrence of digital data errors.

The foregoing object of the invention has been achieved by the provision of a signal reproducing device which, according to the invention, comprises: a head assembly for tracing tracks on which predetermined digital data and tracking pilot signals have been recorded, the head assembly being larger in width than the tracks; a detecting circuit for detecting a pilot signal from the reproduction output of the head assembly to form a tracking error signal; a counter for counting digital data errors in the reproduction output of the head assembly; a comparison circuit for comparing the output of the counter with predetermined reference values; an addition circuit for adding a predetermined offset signal to the tracking error signal according to the output of the comparison circuit; and a servo circuit for controlling the tracking conditions of the head assembly according to the output of the addition circuit.

At least predetermined digital data and tracking pilot signals are recorded on the tracks of the tape. The head assembly traces the tracks to provide a reproduction output, which is applied to the detecting circuit and the counter. The detecting circuit detects the pilot signal to form the tracking error signal. The counter counts the digital data errors. The comparison circuit compares the count value of the counter with the predetermined reference values. The addition circuit adds the predetermined offset signal to the tracking error signal according to the output of the comparison circuit. The servo circuit controls the tracking conditions of the head assembly according to the output of the addition circuit.

In accordance with another aspect of the invention, at least predetermined digital data and tracking pilot signals are recorded on the tracks of a magnetic tape. The head assembly traces the tracks to provide a reproduction output, which is applied to respective detecting circuits. The first detecting circuit detects the pilot signal to form the tracking error signal, while the second detecting circuit detects the level of the RF signal. The comparison circuit compares the output of the second detecting circuit with the predetermined reference values. The addition circuit adds the predetermined offset signal to the tracking error signal according to the output of the comparison circuit. The servo circuit controls the tracking conditions of the head assembly according to the output of the addition circuit.

BRIEF DESCRIPTION OF THE DRAWINGS

In the accompanying drawings:

FIGS. 9A to 9C are a waveform diagram showing various RF signals in the circuit of FIG. 8;

FIGS. 10A to 10E are a timing chart for a description of the operation of the R-DAT of the second embodiment.

DESCRIPTION OF THE PREFERRED EMBODIMENTS

Figure 1:
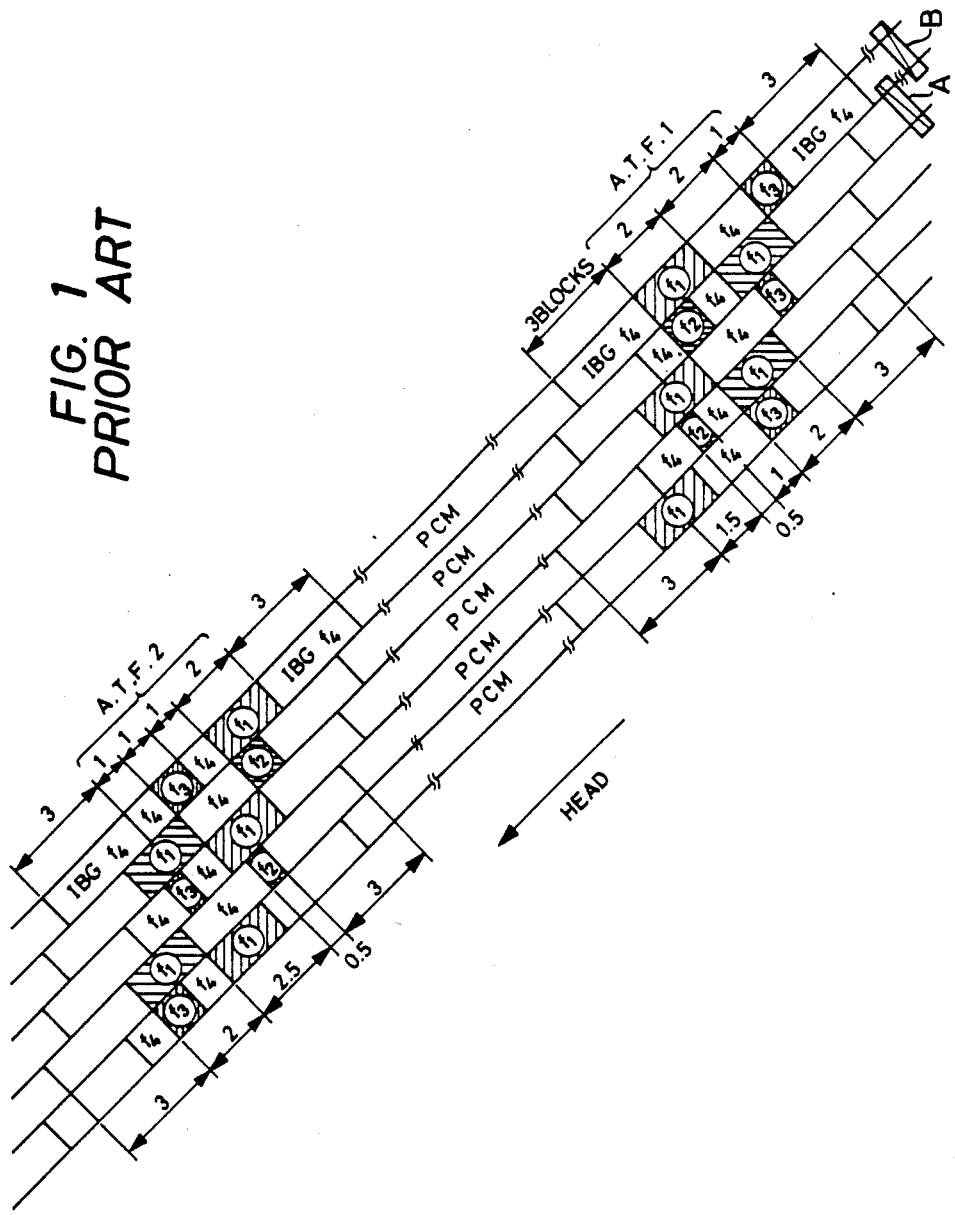
FIGS. 1 and 2 are explanatory diagram showing track patterns in a conventional R-DAT.
Figure 2:
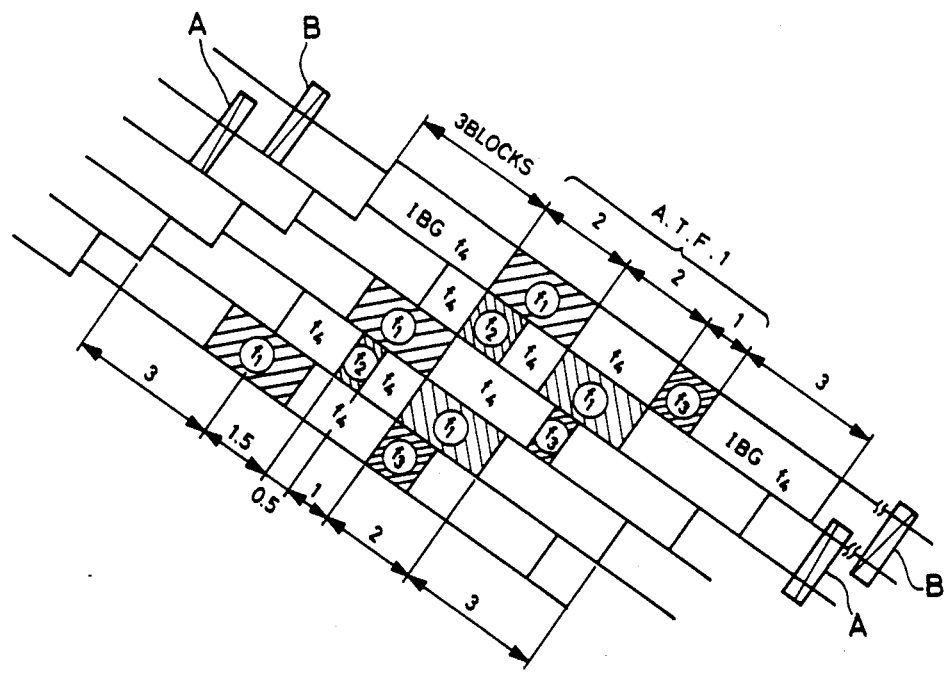
Figure 3:
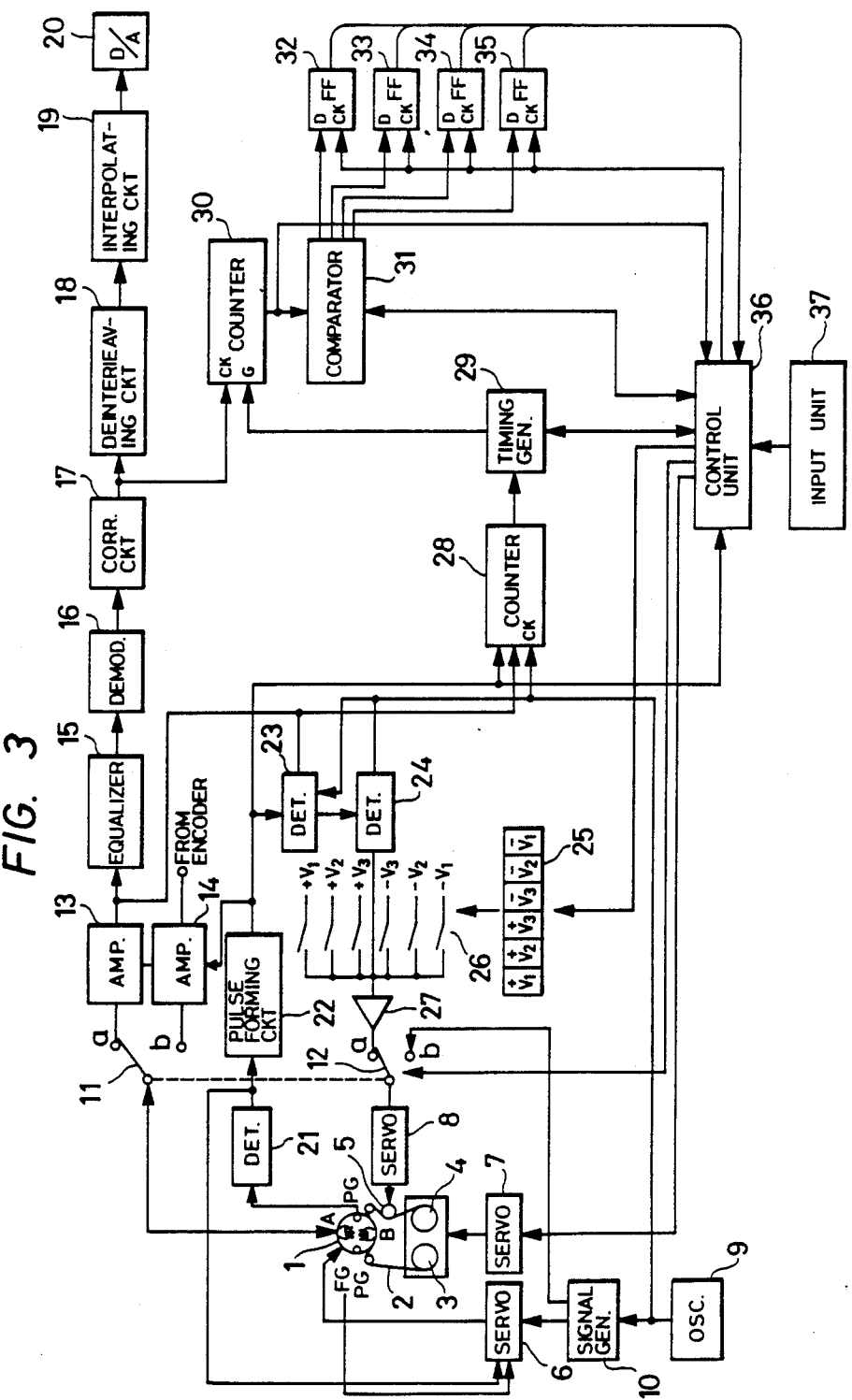
FIG. 3 is a block diagram showing an R-DAT constructed according to the invention.

FIG. 3 is a block diagram showing an R-DAT to which a signal reproducing device of the invention is applied. Predetermined modes can be inputted by operating an input unit 37 having switches and pushbuttons. In response to an input from the input unit 37, a control circuit 36, implemented, for instance, with a microcomputer, controls the various circuit elements so that a predetermined operation, for instance, a recording operation, is carried out.

An oscillator circuit 9, namely, a crystal oscillator circuit, outputs a clock signal, which is applied to a number of circuits including a signal generating circuit 10. The circuit 10 generates two different reference signals in synchronization with the clock signal. Specifically, a reference signal having a first frequency is applied to a servo circuit 6, and a reference signal having a second frequency is applied through a switch 12 to a servo circuit 8. A PG signal is produced in synchronization with the rotation of a rotary drum 1 and is detected by a detecting circuit 21, the detection signal of which is applied to the servo circuit 6. An FG signal is also applied to the servo circuit 6. The servo circuit 6 compares these signals for phase servo and frequency servo with the reference signal, and controls the rotation of the rotary drum 1 according to error signals produced as a result of the comparison. In the recording mode, the armature of the switch 12 is set to a contact b, in which case the servo circuit 8 rotates a capstan 5 at a predetermined speed in response to the reference signal applied thereto. Rotation of reels 3 and 4 for a magnetic tape 2 is controlled by a servo circuit 7. Recording signals, such as digital data and sub-code data, inputted by an encoder or the like (not shown) are amplified by an amplifier circuit 14 and are applied to rotary heads A and B through a switch 11, the armature of which is set to a contact b in the recording operation. Similarly, an ATF signal is applied through the amplifier circuit 14 and the switch 11 to the rotary heads A and B. A pulse forming circuit 22 provides a head switching pulse (HSWP) for switching between rotary heads A and B in synchronization with the output of the detecting circuit 21. The amplifier circuit 14, being controlled by the head switching pulse, applies its output alternately to the rotary heads A and B.

Figure 4:
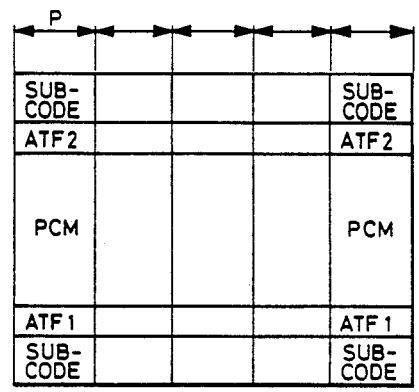
FIGS. 4 through 6 are explanatory diagrams showing track patterns in the R-DAT.

Thus, PCM digital data, sub-codes, and ATF signals are recorded on slanted tracks on the magnetic tape 2. The track pattern is, for instance, as shown in FIG. 4.

When the reproduction mode is instructed, the armature of the switch 11 is set to a contact a. Therefore, reproduction signals outputted by the rotary heads A and B tracing the tracks are applied through the switch 11 to an amplifier circuit 13. The output of the amplifier circuit 13 is applied to an equalizer 15 where it is subjected to equalization. The output of the equalizer 15 is applied to a demodulating circuit 16 where it is subjected to eight-of-ten demodulation to provide an NRZ signal. The demodulation output is subjected to error correction in a correcting circuit 17 and then applied to a deinterleaving circuit 18 where it is deinterleaved. The output of the deinterleaving circuit 18 is applied to an interpolating circuit 19 where uncorrectable errors are interpolated. The output of the interpolating circuit 19, after being subjected to D/A (digital-to-analog) conversion by a D/A conversion circuit 20, is applied, for instance, to a loudspeaker (not shown).

A detecting circuit 23 counts a predetermined number of clock pulses by counting the edges of the head switching pulses produced by the pulse forming circuit 22 to provide a window value corresponding to the recording region of the tracking synchronizing signals $f_2$ and $f_3$, and detects the synchronizing signals $f_2$ and $f_3$ from the output of the amplifier circuit 13 during the window time so defined. The detection signal of the synchronizing signals $f_2$ and $f_3$ is applied to a detecting circuit 24. The detecting circuit 24 monitors the output of the amplifier circuit 13 to detect the level of a pilot signal (crosstalk component) at the time of the detection of the synchronizing signals and the time of detection of the pilot signal a predetermined period of time thereafter, and forms a tracking error signal according to the difference therebetween. The tracking error signal is applied through an amplifier circuit 27 and the switch 12 to the servo circuit 8. The servo circuit 8 controls the rotation of the capstan 5 according to the tracking error signal so that the tracking conditions of the rotary heads A and B are controlled.

Figure 5:
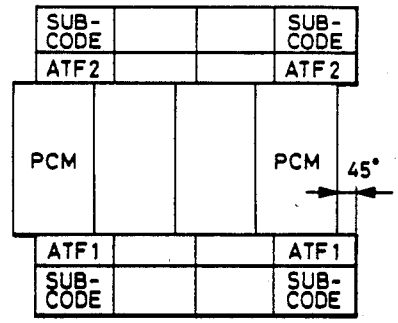
Figure 6:
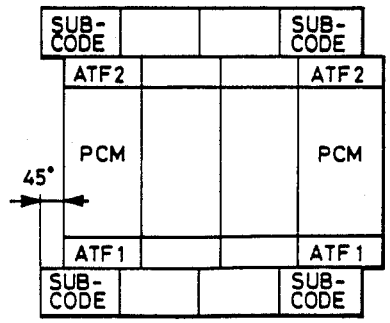

When an after-recording mode is instructed, the control circuit 36 operates to set the armature of the switch 11 to the contact a for the ATF recording region, and to set it to the contact b for the PCM recording region (for after-recording PCM signals) or the sub-code recording region (for recording sub-code signals). In this operation, an offset signal is not added to the tracking error signal. Therefore, when PCM signals or sub-code signals are recorded, the recording track is shifted from the reproducing track by as much as a predetermined amount (45°) as shown in FIGS. 5 and 6.

In the playback of the magnetic tape after-recorded in the above-described manner, tracking control is carried out as follows:

A counter counts the clock pulses using the edges of the head switching pulses, and applies the count value to a timing signal generating circuit 29. The circuit 29 produces different timing signals separately according to the count values. A timing signal corresponding to the PCM recording region is applied to a counter 30. For the period of time the timing signal is applied to the counter 30, the latter counts C1 errors as indicated by the output of the correcting circuit 17 (i.e., the PCM digital data errors in a track are counted). The count value N of the counter 30 is supplied to a comparison circuit where it is compared with predetermined references.

Figure 7:
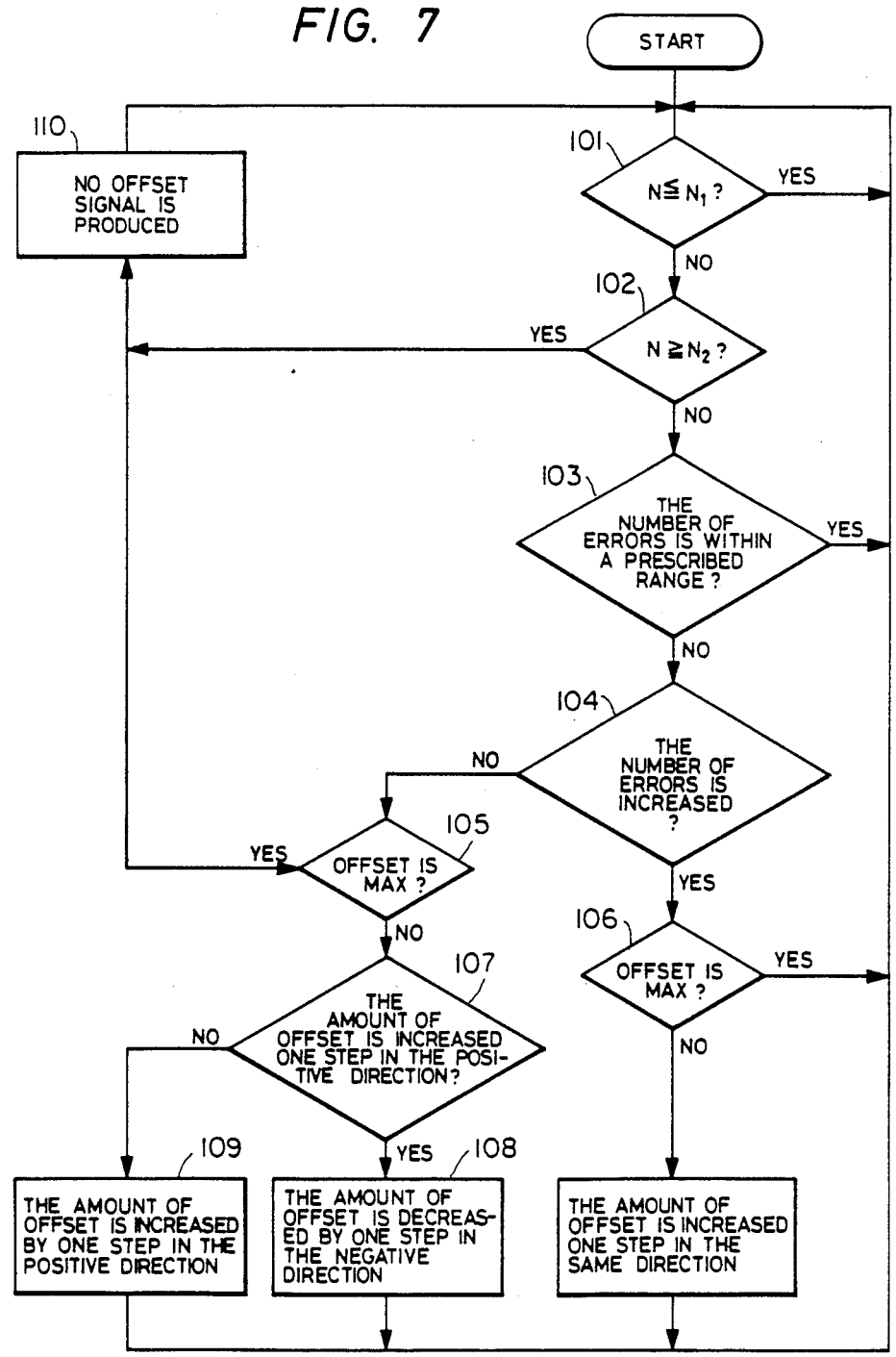
FIG. 7 is a flowchart for a description of the operation of the R-DAT.

As shown in FIG. 7 (step 101), when the count value N is equal to or smaller than a first reference value $N_1$, a D flip-flop 32 is set. In this case, the reproducing data is satisfactory, and the control circuit 36 produces no offset signal.

When the count value is equal to or larger than a second reference value $N_2$, a D flip-flop 35 is set (step 102). In this case, the errors are mostly attributed to factors (such as dropout) other than tracking conditions Therefore, no offset signal is produced, and the offset signal which has been produced is set to zero (step 110).

When the value N is between the first and second reference values $N_1$ and $N_2$, the value N is compared with the value N provided for the preceding track (step 103). When the difference is within a predetermined reference range, for instance, when N is substantially equal to the value provided for the preceding track, a D flip-flop 32 is set. In this case, the number of C1 errors is maintained substantially unchanged even if the amount of offset is changed (the rotary heads A and B substantially tracing the middle of the track, that is, the PCM recording region), and therefore the amount of offset is maintained as it is. When the difference between the two values N exceeds the reference range, a D flip-flop 34 is set and the two values are subjected to comparison. When the value N is smaller than that provided for the preceding track (step 104) (the number of errors is smaller than that in the case of the preceding track), the amount of offset is maintained ,unchanged if it is a maximum ($\pm V_1$ in this embodiment), (steps 105, 110) and if not, the amount of offset is increased one step in the positive direction (step 107); that is, for a voltage $V_3$ a voltage $V_2$ is set, and for the voltage $V_2$, a voltage $V_1$ is set. If, when the value N is larger than that provided for the preceding track (the number of errors has increased), the amount of offset is a maximum, and hence it is determined that the number of errors has abruptly increased due to factors other than tracking conditions, whereupon the offset signal is set to zero (step 106).

In the case where the amount of offset is not yet a maximum, the direction of addition of the offset is determined. In the case where offsetting has been carried out in the positive direction (step 107), the amount of offset is decreased by one step in the negative direction (step 108). For instance, for the voltage $V_2$, the voltage $V_3$ is set, and for the voltage $V_3$, the voltage is set to zero. In the case where, on the other hand, offsetting has been carried out in the negative direction, the amount of offset is increased one step in the positive direction (step 109). For instance, for the voltage $V_3$, the voltage $V_2$ is set, and for the voltage $V_2$, the voltage $V_1$ is set.

The above-described operations are repeatedly carried out to achieve the most suitable amount of offset.

The above-described operations are summarized in the flowchart shown in FIG. 7.

The control unit 36 controls a drive circuit 25 in response to flags set by the D flip-flops 32 through 35 so that switches 26 are selectively turned on to produce predetermined fixed offset voltages $\pm V_1$, $\pm V_2$ and $\pm V_3$. The offset voltage thus produced is applied to an amplifier circuit 27, serving as an addition circuit, where it is added to the tracking error signal. The output of the amplifier circuit 27 is applied through the switch 12 to the servo circuit 8. As a result, the rotary heads A and B trace the tracks in such a manner that their center coincides with the center of the PCM recording region.

The invention is also applicable to special reproducing modes other than the after-recording mode.

As described above, the signal reproducing device of the invention includes the head assembly for tracing tracks on which predetermined digital data and tracking pilot signals have been recorded, the head assembly being larger in width than the tracks; the detecting circuit for detecting the pilot signals from the reproduction output of the head assembly to form the tracking error signals; the counter for counting the digital data errors from the reproduced output from the head assembly; the comparison circuit for comparing the output of the counter with the predetermined reference values; the addition circuit for adding the selected offset signal to the tracking error signal according to the output of the comparison circuit; and the servo circuit for controlling the tracking conditions of the head assembly according to the output of the addition circuit. In this arrangement, the signal reproducing device according to the invention can reproduce digital data with high accuracy, not only in the case where track bending is caused by after-recording, but also in the case where track bending is caused by other factors.

Figure 8:
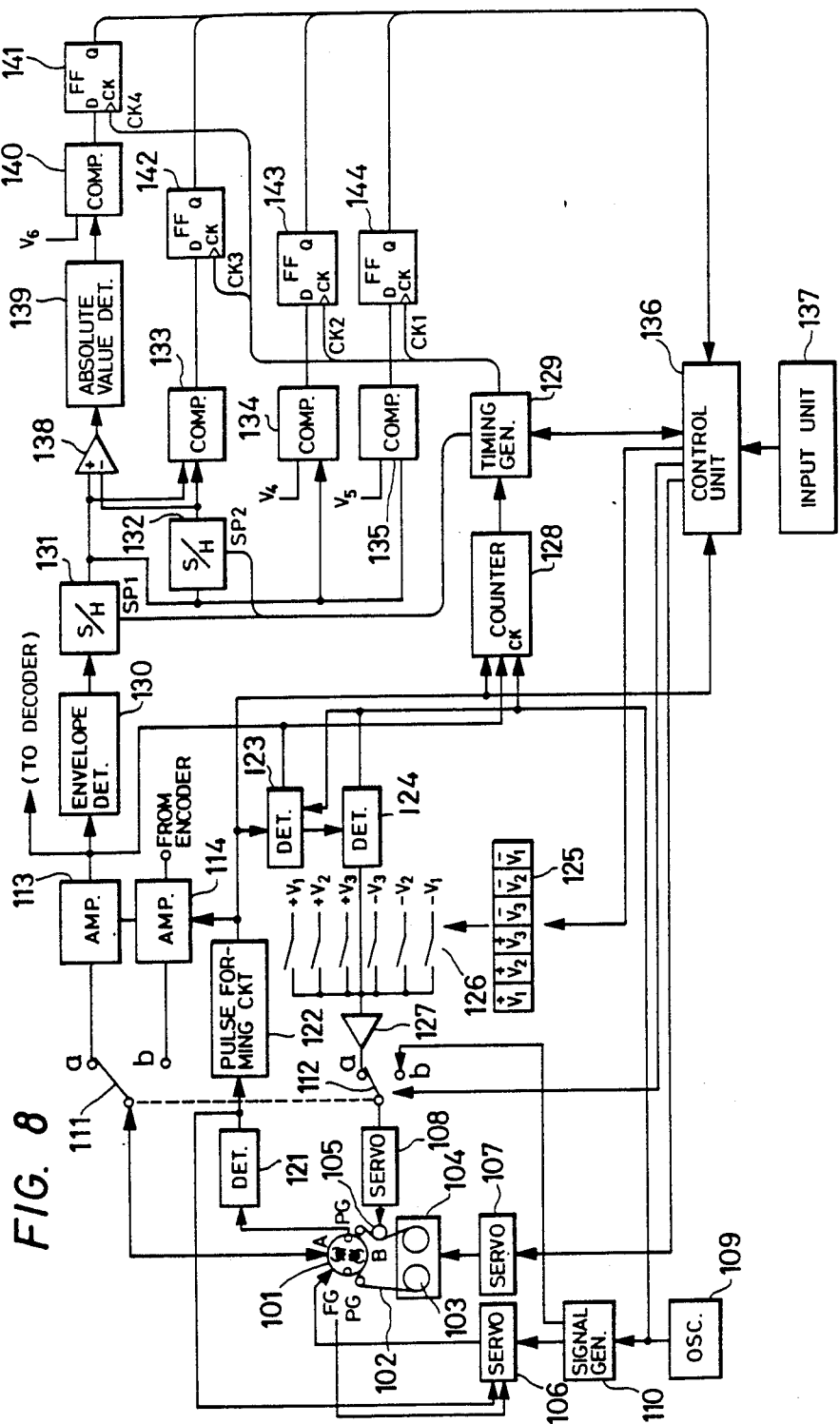
FIG. 8 is a block diagram showing an R-DAT according to a second embodiment of the invention.

FIG. 8 is a block diagram showing another R-DAT embodying a signal reproducing device of the invention. As in the previously described embodiment, predetermined modes can be instructed by operating an input unit 137 composed of switches and pushbuttons. In response to an input from the input unit 37, a control circuit 136, implemented, for instance, with a microcomputer, controls the various circuit elements so that a predetermined operation, for instance, a recording operation, is carried out.

An oscillator circuit 109, namely, a crystal oscillator circuit, outputs a clock signal, which is applied to a number of circuits including a signal generating circuit 110. The circuit 110 generates two different reference signals in synchronization with the clock signal. Specifically, a reference signal having a first frequency is applied to a servo circuit 106, and a reference signal having a second frequency is applied through a switch 112 to a servo circuit 108. A PG signal is produced in synchronization with rotation of a rotary drum 101 and is detected by a detecting circuit 121, the detection signal of which is applied to the servo circuit 106. The servo circuit 106 compares these signals for phase servo and frequency servo with the reference signal, and controls the rotation of the rotary drum 101 according to errors signals produced as a result of the comparison. In a recording mode, the armature of the switch 112 is set to a contact b, in which case the servo circuit 108 rotates a capstan 105 at a predetermined speed in response to the reference signal applied thereto. Rotation of reels 103 and 104 for a magnetic tape 102 is controlled by a servo circuit 107.

Recording signals, such as digital data and sub-code data, inputted by an encoder or the like (not shown) are amplified by an amplifier circuit 114 and are applied to rotary heads A and B through a switch 111, the armature of which is set to a contact b in the recording operation. Similarly, an ATF signal is applied through the amplifier circuit 114 and the switch 111 to the rotary heads A and B. A pulse forming circuit 122 provides a head switching pulse (HSWP) for switching between the rotary heads A and B in synchronization with the output of the detecting circuit 121. The amplifier circuit 114, being controlled by the head switching pulse, applies its output alternately to the rotary heads A and B.

Thus, PCM digital data, sub-codes, and ATF signals are recorded on slanted tracks on the magnetic tape 102. In this case, the track pattern is, for instance, as shown in FIG. 4 discussed above.

When the reproduction mode is instructed, the armature of the switch 111 is set to a contact a. Therefore, reproduction signals outputted by the rotary heads A and B tracing the tracks are applied through the switch 111 to an amplifier circuit 113. The output of the amplifier circuit 113 is applied to a decoder (not shown).

A detecting circuit 123 counts a predetermined number of clock pulses by counting the edges of the head switching pulses produced by the pulse forming circuit 122 to provide a window value corresponding to a recording region of the tracking synchronizing signals $f_2$ and $f_3$, and detects the synchronizing signals $f_2$ and $f_3$ from the output of the amplifier circuit 113 during the window time so defined. The detection signal of the synchronizing signals $f_2$ and $f_3$ is applied to a detecting circuit 124. The circuit 124 monitors the output of the amplifier circuit 113 to detect the level of a pilot signal (crosstalk component) at the time of the detection of the synchronizing signals and the time of detection of the pilot signal a predetermined period of time thereafter, and forms a tracking error signal according to the difference therebetween. The tracking error signal is applied through an amplifier circuit 127 and the switch 112 to the servo circuit 108. The servo circuit 108 controls the rotation of the capstan 105 according to the tracking error signal so that the tracking conditions of the rotary heads A and B are controlled.

When an after-recording mode is specified, the control circuit 136 operates to set the armature of the switch 111 to the contact a for the ATF recording region, and set it to the contact b for the PCM recording region (for after-recording PCM signals) or the sub-code recording region (for recording sub-code signals). In this operation, an offset signal is not added to the tracking error signal. Therefore, when PCM signals or sub-code signals are recorded, the recording track is shifted from the reproducing track by as much as a predetermined amount (45°) as shown in FIGS. 5 and 6.

When the magnetic tape recorded in the recording mode is played back, the RF signal waveform is as shown in FIG. 9A. When a magnetic tape on which PCM data have been recorded by after-recording is played back without modification, then the RF signal waveform is as shown in FIG. 9C. In this case, the PCM region level is decreased, and hence the error rate may be increased. Therefore, in the playback of the above-described magnetic tape, tracking control is carried out as follows to obtain an RF signal waveform at least as shown in FIG. 9B.

A counter 128 counts clock pulses by counting the edges of the head switching pulses, and supplies the count value to a timing signal generating circuit 129. The circuit 129 produces timing signals such as sample pulses SP1 and SP2 and clock pulses CK1 through CK4 separately according to the count values of the counter. The sample pulse SP1 is applied to a sample and hold circuit 131. An RF signal outputted by the amplifier circuit 113 is applied to a detector circuit 130 where its level (envelope) is detected. The sample and hold circuit 131 samples and holds the output of the detector circuit 130 with the timing of the sample pulse SP1. As shown in FIGS. 10A and 10B the middle part of about 150 µs of the PCM region of the RF signal is a sampling interval. At the start of the sampling interval, the sample pulse SP1 (FIG. 10C) is produced. The clock pulses CK1 through CK4 (FIG. 10D) are produced 20 µs after the sample pulse SP1. The sample pulse SP2 (FIG. 10E) is produced 100 µs after the clock pulses. Therefore, the sample and hold circuit 131 samples and holds the level $E_1$ at substantially the middle of the PCM data on a track being traced.

The sampled and held voltage $E_1$ is applied to a comparison circuit 134 where it is compared with a predetermined reference voltage $V_4$ (step 201 in FIG. 110). When the voltage $E_1$ is equal to or higher than the reference voltage $V_4$, a D flip-flop 143 is set (i.e., the Q output is raised to the "H" level). In this case, the reproduced data is satisfactory, and therefore the control circuit 136 produces no offset signal.

The voltage $E_1$ is applied to another comparison circuit 135 where it is compared with a reference voltage $V_5$ ($V_4 > V_5$) (step 202). When the voltage $E_1$ is equal to or smaller than the voltage $V_5$, a D flip-flop 144 is set with the timing of the clock pulse CK1. In this case, the errors are most likely attributed to factors, such as dropout, arising due to other than tracking conditions. Therefore, no offset signal is produced, and the offset signal which has been produced is set to zero.

When the voltage $E_1$ is between the reference voltages $V_5$ and $V_4$, the voltage $E_1$ is compared with a sampled and held voltage $E_2$ provided for the preceding track. For this purpose, the voltage $E_1$ is applied to a sample and hold circuit 132 where it is sampled and held with the timing of the sample pulse SP2. The sample and hold circuit 131 samples and holds a new voltage with the timing of a new sample pulse SP1. Thus, the voltage $E_1$ of the present track is held by the sample and hold circuit 131, and the voltage $E_2$ of the preceding track is held by the sample and hold circuit 132. The difference between these voltages is calculated by a differential amplifier 138. The output of the amplifier 138 is applied to an absolute value detecting circuit 139 where its absolute value is detected. The voltage thus detected is applied to a comparison circuit 140 where it is compared with a reference voltage $V_6$ (step 203). When it is equal to or lower than the voltage $V_6$ (for instance, substantially zero), a D flip-flop 141 is set with the timing of the clock pulse CK4. In this case, the RF signal level is maintained substantially unchanged (being stable as the rotary heads A and B trace the substantially the middle part of the track that is, the PCM recording region), the amount of offset is maintained as it is.

When the detected voltage exceeds the reference voltage $V_6$, the present voltage. $E_1$ is compared with the preceding voltage $E_2$ (step 204). For this purpose, the outputs of the sample and hold circuits 131 and 132 are applied to a comparison circuit 133. When the voltage $E_1$ is higher than the voltage $E_2$, a D flip-flop 142 is set with the timing of the clock pulse CK3.

If, when the present voltage $E_1$ is larger than the preceding voltage $E_2$, the amount of offset which, has been provided is maximum, then it is maintained unchanged (step 205); and if not, the amount of offset is increased one step in the same direction 1 (step 206). That is, with a voltage $V_3$, a voltage $V_2$ is set, and with the voltage $V_2$, a voltage $V_1$ is set.

If, when the present voltage $E_1$ is lower than the preceding voltage $E_2$, the amount of offset is a maximum, then it is determined that the number of errors has abruptly increased due to factors other than the tracking conditions, and hence the offset signal is set to zero (step 207).

When the amount of offset is not yet a maximum, the direction of addition of the offset is determined. In the case where offsetting has been made in the positive direction (step 208), the amount of offset is decreased one step in the negative direction (step 209); for instance, for the voltage $V_2$, the voltage $V_3$ is set, and for the voltage $V_3$, the voltage is set to zero. In the case where offsetting has been carried out in the negative direction, the amount of offset is increased one step in the positive direction (step 210). For instance, with the voltage $V_3$, the voltage $V_2$ is set, and for the voltage $V_2$, the voltage $V_1$ is set.

The above-described operations are repeatedly carried out to achieve the most suitable amount of offset.

Figure 11:
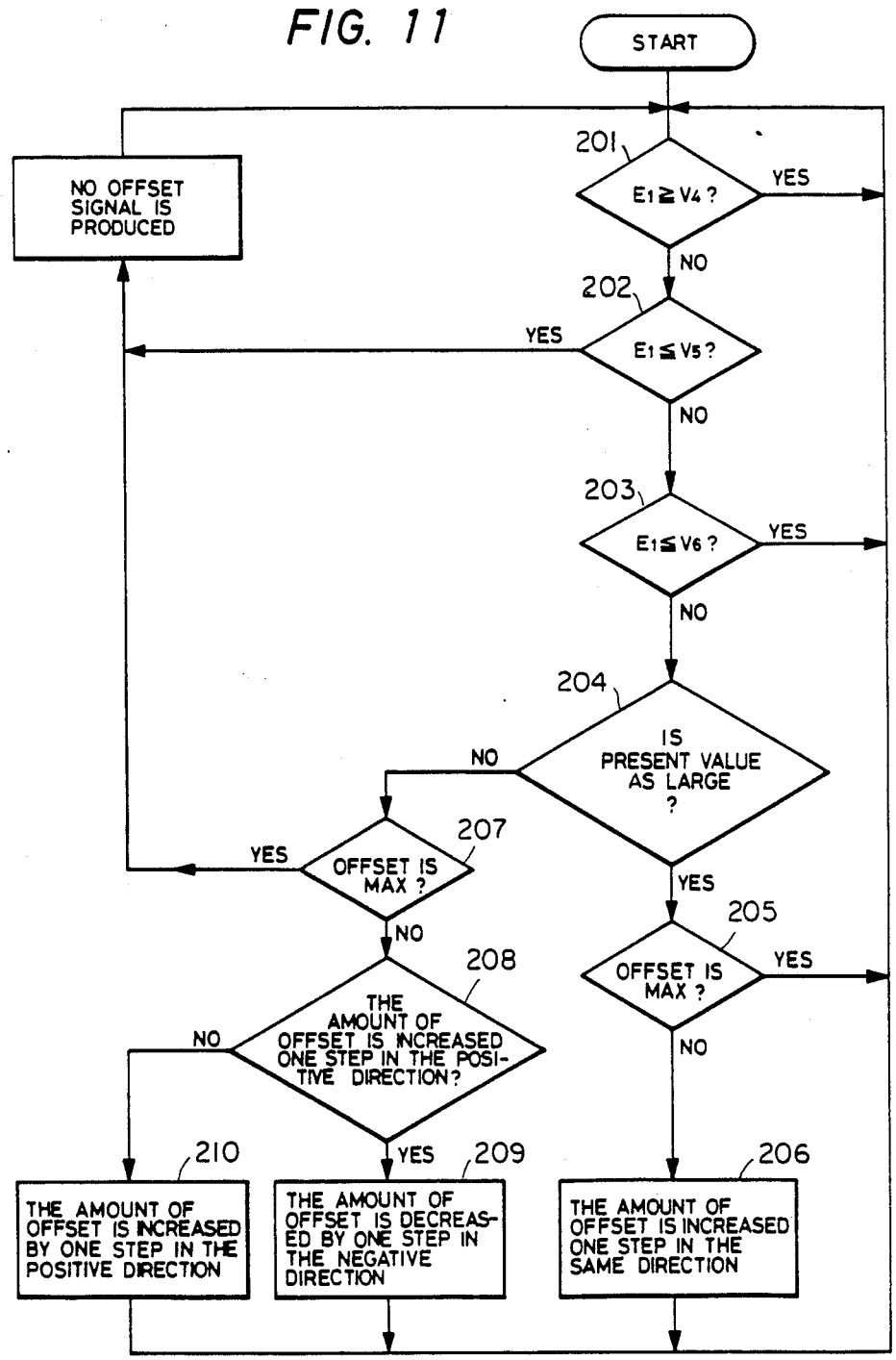
FIG. 11 is a flowchart for a description of the operation of the R-DAT of the second embodiment.

The above-described operation are summarized in the flowchart of FIG. 11.

The control circuit 136 controls a drive circuit 125 in response to flags set by the D flip-flops 141 through 144 so that switches 126 are selectively turned on to produce predetermined fixed offset voltages $\pm V_1$, $\pm V_2$ and $\pm V_3$. The offset voltage thus produced is applied to an amplifier circuit 127 serving as an addition circuit where it is added to the tracking error signal. The output of the amplifier circuit 127 is applied through the switch 112 to the servo circuit 108. As a result, the rotary heads A and B trace the tracks in such a manner that their center coincides with the center of the PCM recording region.

As described above, the signal reproducing device of the second embodiment of the invention includes the head assembly for tracing tracks on which predetermined digital data and tracking pilot signals have been recorded, the head assembly being larger in tracking width than the tracks; the detecting circuit for detecting the pilot signal from the output of the head assembly to form the tracking error signal; the detecting circuit for detecting the level of an RF signal reproduced by the head assembly; the comparison circuit for comparing the output of the detector circuit with the predetermined reference values; the addition circuit for adding the predetermined offset signal to the tracking error signal according to the output of the comparison circuit; and the servo circuit for controlling the tracking conditions of the head assembly according to the output of the addition circuit. With this construction, the signal reproducing device of this embodiment of the invention can reproduce digital data with a high accuracy not only in the case where the track bending is caused by after-recording but also in the case where the track bending is caused by other factors.

What is claimed is:

1. A signal reproducing device comprising:
   a head assembly for tracing tracks on which predetermined digital data and tracking pilot signals have been recorded, said head assembly being larger in tracking width than said tracks;
   means for detecting a pilot signal from a reproduction output of said head assembly to form a tracking error signal;
   means for counting digital data errors in said reproduction output of said head assembly;
   means for comparing an output of said counting means with predetermined reference values;
   means for adding a predetermined offset signal to said tracking error signal according to an output of said comparing means; and
   a servo circuit for controlling tracking conditions of said head assembly according to an output of said addition circuit.

* * * * *